(12) United States Patent
Deivasigamani et al.

(10) Patent No.: US 10,012,393 B2
(45) Date of Patent: Jul. 3, 2018

(54) COMBINED HOT WATER AND SPACE HEATING AND CONDITIONING SYSTEM INCLUDING HEAT PUMP

(71) Applicants: Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 183 days.

(21) Appl. No.: 14/977,837

(22) Filed: Dec. 22, 2015

(65) Prior Publication Data

US 2016/0178219 A1 Jun. 23, 2016

Related U.S. Application Data

(60) Provisional application No. 62/095,262, filed on Dec. 22, 2014.

(51) Int. Cl.
*F24D 3/18* (2006.01)
*F24D 3/08* (2006.01)
(Continued)

(52) U.S. Cl.
CPC ............... *F24D 3/08* (2013.01); *F24D 3/02* (2013.01); *F24D 3/087* (2013.01); *F24D 3/18* (2013.01);
(Continued)

(58) Field of Classification Search
CPC ... F24D 3/08; F24D 3/087; F24D 3/18; F24D 3/02; F24D 15/04; F24D 2200/04;
(Continued)

(56) References Cited

U.S. PATENT DOCUMENTS

| 4,452,620 A | * | 6/1984 | Dosmond | F24D 3/00 |
| | | | | 165/921 |
| 4,462,542 A | * | 7/1984 | Person | F24D 5/00 |
| | | | | 126/502 |

(Continued)

FOREIGN PATENT DOCUMENTS

GB 2142136 A * 1/1985 ............... F24D 3/18

*Primary Examiner* — Gregory Huson
*Assistant Examiner* — Daniel E Namay
(74) *Attorney, Agent, or Firm* — Tracy Jong Law Firm; Tracy P. Jong; Cheng Ning Jong (57) ABSTRACT

A combined water heating, space heating and space cooling system configured to provide hot water to a point of demand and heat or cool a space. The system comprises a heat pump operably connected to the space, a water flow loop including a main heat exchanger, a fluid mover for moving a fluid configured to flow within the flow loop, an air-to-water heat exchanger, a burner adapted to heat the fluid, a blower having an air inlet end and an air outlet end, wherein the blower is adapted to move air through the air-to-water heat exchanger and operably connected to the main heat exchanger and a secondary heat exchanger operably connecting the flow loop and the heat pump. The air-to-water heat exchanger is disposed on the air inlet end and the main heat exchanger is disposed on the air outlet end.

6 Claims, 7 Drawing Sheets

(51) Int. Cl.
*F24D 3/02* (2006.01)
*F24D 15/04* (2006.01)
*F24D 7/00* (2006.01)
*F24F 5/00* (2006.01)
*F24D 17/02* (2006.01)
*F24D 12/02* (2006.01)

(52) U.S. Cl.
CPC ............... *F24D 7/00* (2013.01); *F24D 15/04* (2013.01); *F24F 5/001* (2013.01); *F24F 5/0096* (2013.01); *F24D 2200/04* (2013.01); *F24D 2200/123* (2013.01)

(58) Field of Classification Search
CPC ...... F24D 2200/123; F24D 7/00; F24D 17/02; F24D 12/02; F24F 5/001; F24F 5/0096; F24F 2221/18
USPC .............................................. 237/19, 2 B, 62
See application file for complete search history.

(56) References Cited

U.S. PATENT DOCUMENTS

| | | | | |
|---|---|---|---|---|
| 4,557,220 | A * | 12/1985 | Jannemann | F23D 14/58 122/155.1 |
| 5,165,596 | A * | 11/1992 | Le Mer | F24H 9/122 137/557 |
| 5,174,365 | A * | 12/1992 | Noguchi | F24F 11/00 165/240 |
| 6,860,430 | B2 * | 3/2005 | Sanchez | F24D 19/1084 236/11 |
| 7,398,778 | B2 * | 7/2008 | Kaiser | F24F 3/001 122/40 |
| 7,597,066 | B2 * | 10/2009 | Shimada | F23N 1/082 122/14.22 |
| 8,245,948 | B2 * | 8/2012 | Cho | F25B 27/02 122/1 R |
| 2004/0118933 | A1 * | 6/2004 | Readio | F24D 12/02 237/2 B |
| 2008/0023961 | A1 * | 1/2008 | Cho | F25B 27/02 290/2 |
| 2012/0222631 | A1 * | 9/2012 | Lesage | F25B 25/005 122/18.5 |
| 2016/0320075 | A1 * | 11/2016 | Deivasigamani | F24D 19/1066 |

* cited by examiner

SPACE HEATING WHEN OUTSIDE WEATHER IS
BETWEEN 40 °F – 60 °F

FIG. 6

SPACE HEATING WHEN OUTSIDE WEATHER IS UNDER 40 °F

FIG. 7

SUMMER – POSSIBLE ENERGY TRAJECTORIES

WITHOUT DOMESTIC WATER FLOW

FIG. 8

WITH DOMESTIC WATER FLOW

FIG. 9

COMBINED HOT WATER AND SPACE HEATING AND CONDITIONING SYSTEM INCLUDING HEAT PUMP

PRIORITY CLAIM AND RELATED APPLICATIONS

This non-provisional application claims the benefit of priority from provisional application U.S. Ser. No. 62/095,262 filed Dec. 22, 2014. Said application is incorporated by reference in its entirety.

BACKGROUND OF THE INVENTION

1. The Field of the Invention

The present invention is directed generally to a combined hot liquid, space heating and conditioning system. More specifically, the present invention is directed to a combined hot water, space heating and conditioning system including a heat pump.

2. Background Art

Conventional hot water, space heating and cooling devices come in discrete units. There lacks synergistic heat transfer between these devices. For instance, waste heat energy rejected by one device is not absorbed and taken advantage of by another device, but lost or transferred to the surroundings where it is eventually lost. When heat is required, it is again made available via combustion of gas, oil and consumption of electricity, etc.

Thus, there is a need for a combined system having a device which can harness and take advantage of the energy rejected from another device such that the need for heat can be met via transfer of energy as a result of an operation that already is occurring, e.g., in cooling, etc., in another portion or device of the system.

SUMMARY OF THE INVENTION

In accordance with the present invention, there is provided one embodiment of a combined liquid heating, space heating and space cooling system configured to provide hot liquid to a point of demand and heat or cool a space, the system including:
(a) a heat pump 20 operably connected to the space;
(b) a liquid flow loop comprising:
  (i) a main heat exchanger 10;
  (ii) a fluid mover 4 for moving a fluid within the liquid flow loop;
  (iii) an air-to-liquid heat exchanger 14;
(c) a burner 26 thermally coupled to the main heat exchanger 10, said burner is adapted to heat the fluid;
(d) a blower 16 having an air inlet end and an air outlet end, wherein the blower 16 is adapted to move air through the air-to-liquid heat exchanger 14 and operably connected to the main heat exchanger 10; and
(e) a secondary heat exchanger 18 operably connecting the liquid flow loop and the heat pump 20;
wherein the air-to-liquid heat exchanger 14 is disposed on the air inlet end and the main heat exchanger 10 is disposed on the air outlet end, whereby if heating of the liquid is desired, one of the following sets of conditions or any combinations thereof is selected:
  the burner 26 is turned on and the blower 16 is turned on;
  the fluid mover 4 is turned on;
  the fluid mover 4 is turned on and the heat pump 20 is turned on; and
  the blower 16 is turned on,
if heating of the space is desired, one of the following sets of conditions or any combinations thereof is selected:
  the fluid mover 4 is turned on, the heat pump 20 is turned on in reverse and the blower 16 is turned on; and
  the fluid mover 4 is turned on, the heat pump 20 is turned on in reverse, the burner 26 is turned on and the blower 16 is turned on,
if cooling of the space is desired, at least one of the following sets of conditions or any combinations thereof is selected:
  the fluid mover 4 is turned on and the heat pump 20 is turned on; and
  the fluid mover 4 is turned on, the blower 16 is turned on and the heat pump 20 is turned on.

In one embodiment, the secondary heat exchanger 18 is a plate-type heat exchanger.

In one embodiment, the liquid is water. It shall be apparent that other liquid may be used, e.g., industrial fluids if the demand is for a liquid that is not water.

An object of the present invention is to provide a combined system capable of causing synergistic heat transfer between components or devices within the combined system. Another object of the present invention is to provide a combined system capable of providing hot liquid, space heating and space cooling as a single unit and therefore does not require multiple discrete devices, each serving one or more functions simultaneously, e.g., liquid heating, space heating and space cooling.

Another object of the present invention is to provide a comfort device capable of bi-directional heat transfer and hence capable of efficient heating of liquid and air and cooling of air.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—combined water heating, space heating and space cooling system
4—fluid mover, e.g., pump
6—valve, e.g., solenoid or check valve
8—blower of air source heat pump
10—heat exchanger
12—cabinet
14—air-to-water heat exchanger
16—blower to move air/fuel mixture for combustion in burner or draw air through air-to-water heat exchanger
18—secondary heat exchanger
20—air source heat pump
22—heat transfer coil
24—point of demand
26—burner
28—compressor
30—expansion valve
32—four way valve
34—exhaust
36—flow equipment package
38—air inlet end
40—air outlet end
42—flow loop Particular Advantages of the Invention The present combined system provides hot water, space heating and cooling all in one single unit. The present combined system utilizes a heat pump to remove heat from a space to be cooled and add heat into a hot water system, thereby reducing the load required in meeting hot water demands. The present combined system utilizes an air-to-water heat exchanger to harness heat energy from ambient air and dump it in a flow of water to provide heated water. A dual use blower which is used primarily for directing air flow for combustion at the burner is also used to draw ambient air through an air-to-water heat exchanger to transfer heat from the ambient air via the air-to-water heat exchanger and the main heat exchanger to the water flow through such devices. In addition, the air-to-water and main heat exchangers further serve as radiators where heat can be rejected into the ambient air.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

In an effort to simplify the present disclosure, a component or device is activated when it is said to be "turned on." The lack of such mention in the description of a component or device means that the component or device remains in the off state or the component or device is turned off.

Figure 1:
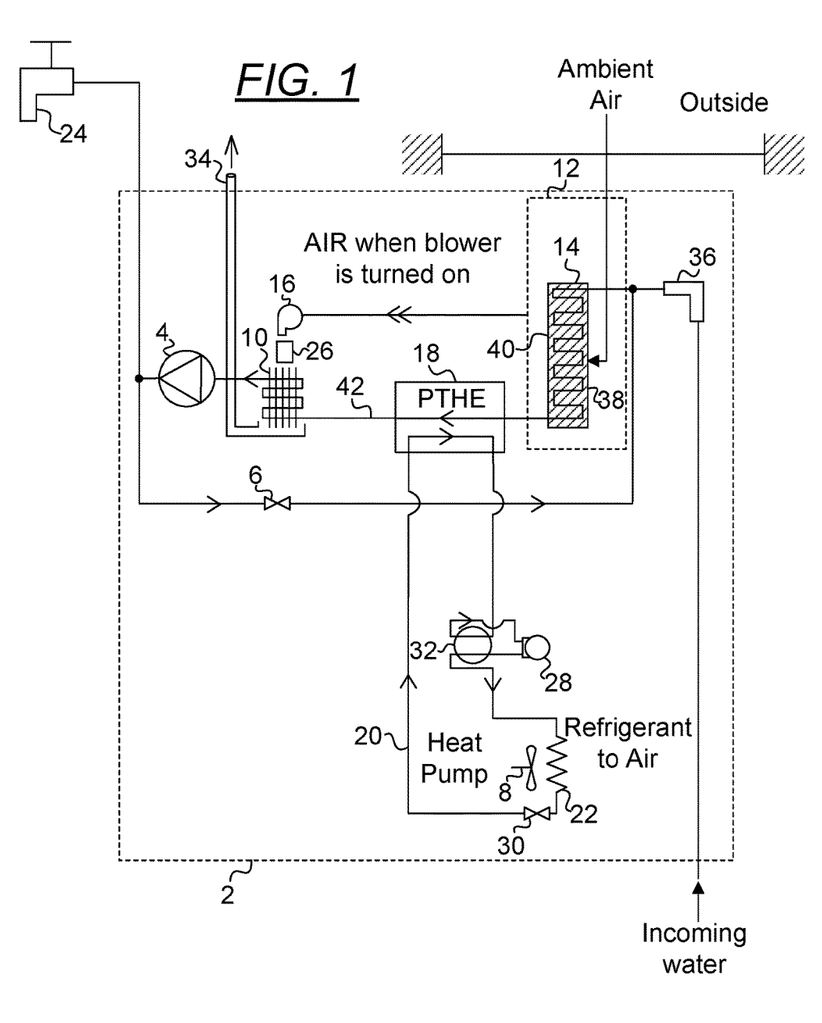
FIG. 1 is a diagram depicting one embodiment of the present combined hot water, space heating and conditioning system.

FIG. 1 is a diagram depicting one embodiment of the present combined hot water, space heating and conditioning system 2. The system 2 is configured to provide hot water to a point of demand 24 and configured to heat or cool a space. The system includes a heat pump 20, a flow loop 42, a blower 16 and a secondary heat exchanger 18. The heat pump 20 is operably connected to the space, i.e., it is placed in the space such that it can affect the thermal state of the space as its heat transfer coil 22 comes in contact with the air in the space. The flow loop 42 includes a main heat exchanger 10, a fluid mover 4 for moving a fluid within the flow loop, an air-to-water heat exchanger 14 and a burner 26 thermally coupled to the main heat exchanger 10 where the burner 26 is adapted to heat the fluid. An electric heating element may be used in place of the burner 26 although less desirably in certain circumstances. The blower 16 includes an air inlet end and an air outlet end. The blower 16 is adapted to move air through the air-to-water heat exchanger 14 and operably connected to the main heat exchanger 10. There is provided an air path connecting the air-to-water heat exchanger 14 and the main heat exchanger 10 such that when the blower 16 is turned on, air is drawn around the flow path of the air-to-water heat exchanger 14 such that heat transfer can occur between the liquid flowing through the air-to-water heat exchanger 14 and the ambient air. The flow of air which has thermally interacted with the air-to-water heat exchanger 14 subsequently arrives at the main heat exchanger where further heat transfer between the flow through the main heat exchanger 10 and the thermally interacted air can occur. The secondary heat exchanger 18 operably connects the flow loop 42 and the heat pump 20. The heat pump 20 is capable of removing heat from the space through its heat transfer coil 22 when the heat pump 20 is operated in its forward direction. When operated in its reverse direction, the heat pump 20 causes heat to be released into the space the heat transfer coil 22 is configured to heat. The air-to-water heat exchanger 14 is disposed on the air inlet end 38 and preferably housed in a cabinet 12 and the main heat exchanger 10 is disposed on the air outlet end 40. A flow equipment package 36 interposed in the main flow loop includes a flow and temperature sensor and a modulating flow control valve for regulating the flow through the main flow loop.

In another embodiment, the present system is not equipped with an air-to-water heat exchanger such as the one disclosed in FIG. 1, in a simplified version of the present system although without an air-to-water heat exchanger, the burner 26 will share a higher heating load when hot water and/or space heating is desired while the heat pump 20 will share a higher cooling load without an air-to-water heat exchanger that can aid in dissipating heat collected from a space to be cooled and collecting heat from ambient air to heat water circulated in the air-to-water heat exchanger.

In another mode, if water heating is desired, the burner 26 is turned on and the blower 16 is turned on. In this mode, a portion of the total heat required to heat the water is drawn from the ambient air flowing around the air-to-water heat exchanger 14. Another portion of the total heat is provided by the burner 26. By turning on the blower 16, the heat provided by the burner 26 can be more efficiently transferred to the fluid of the flow loop 42 and a higher rate of heat transfer can occur between the ambient air and the fluid in the air-to-water heat exchanger 14.

In another mode, if water heating is desired, the fluid mover 4 is turned on. In this mode, heat is drawn from the ambient air flowing around the air-to-water heat exchanger 14. Although this may not be sufficient to heat water to a regularly set setpoint temperature, e.g., 120 degrees F. for hot water, this mode serves to relief the load required to get the water being heated to the setpoint temperature.

In yet another mode, if water heating is desired, the fluid mover 4 is turned on and the heat pump 20 is turned on. Compared to the previous mode, in addition to drawing heat via the air-to-water heat exchanger 14, heat is also drawn via the heat transfer coil 22 of the heat pump 20 and transferred via the secondary heat exchanger 18 to the fluid, e.g., domestic water, of the flow loop 42.

In yet another mode, if water heating is desired, the blower 16 is turned on. The total heat required to heat the water is drawn from the ambient air flowing around the air-to-water heat exchanger 14 and also ambient air flows through the main heat exchanger 10 as a result of the air flow pushed by the blower 16.

The air-to-water heat exchanger 14 is preferably disposed with access to the ambient air of the exterior of a building being serviced. When fluid mover 4 is turned on, a portion of the total heat for space heating is initially rejected from the ambient air into the fluid flowing in the flow loop. However, if the ambient air temperature is sensed to drop below a pre-determined threshold or a level unsuitable for heat transfer into the liquid flowing in the flow loop, the burner 26 is turned on. The heat absorbed by the liquid in the flow loop is then rejected into the fluid (e.g., refrigerant) of the heat pump 20 where the heat is subsequently rejected into the space being heated with the aid of blower 8. The air-to-water heat exchanger is preferably large in total heat transfer surface area.

Figure 6:
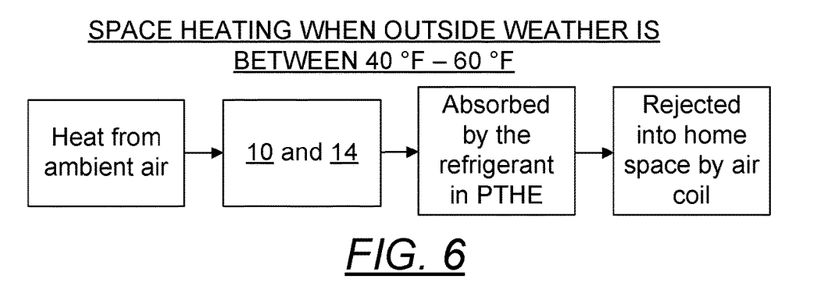
FIG. 6 is a block diagram depicting the actions and conditions of various components of the present combined hot water, space heating and conditioning system when the outside weather is between about 40 degrees F. and about 60 degrees F.

In one mode, if space heating is desired, in addition to turning on the fluid mover 4 and the heat pump 20, the blower 16 is turned on to increase the air flow impinging upon the air-to-water heat exchanger 14 and the main heat exchanger 10 which increases heat transfer to the fluid within the flow loop via both the air-to-water heat exchanger 14 and the main heat exchanger 10. One example of the use of such mode is depicted in FIG. 6 where space heating is required when the outside weather is between about 40 degrees F. and about 60 degrees F.

In yet another mode, if space heating is desired, in addition to turning on the fluid mover 4 and the heat pump 20, the burner 26 and the blower 16 are turned on to quickly transfer heat to the fluid within the flow loop. The refrigerant-absorbed heat is then subsequently transferred via the heat pump 20 to the space being heated. One example of the use of such mode is depicted in FIG. 6 where space heating is required when the outside weather is under about 40 degrees F.

It shall be noted that, in space heating modes, heat is transferred to the fluid of the heat pump 20 at the secondary heat exchanger 18 and rejected via the aid of blower 8 into the space to be heated. Heat contained in the fluid of the heat pump 20 is released to the space being heated via the heat transfer coil 22. It shall also be noted that in cases where blower 16 is turned on, it is turned on in conjunction with the burner to produce a flue gas at exhaust 34 or it is simply turned on to cause an air flow which exits at exhaust 34 when the burner 26 is not used.

In one mode, if space cooling is desired, the fluid mover 4 and the heat pump 20 are turned on. Heat is absorbed from the air in the space to be cooled via the fluid in the heat pump 20 and rejected via the secondary heat exchanger 18 into the liquid of the flow loop 42. When circulated in the flow loop 42, this absorbed heat is rejected via the air-to-water and main heat exchanger 14, 10 into the ambient air. If hot water is requested while space cooling is in progress, valve 6 is closed to prevent influx of hot water due to burner 26 heating which may commence due to the hot water request.

In another mode, if space cooling is desired, the fluid mover 4, the blower 16 and the heat pump 20 are turned on. In this mode, the blower 16 is turned on to accelerate the rate at which heat from the air-to-water heat exchanger 14 can be dissipated into the ambient air. In one embodiment, the secondary heat exchanger 18 is a plate-type heat exchanger disposed just downstream from the air-to-water heat exchanger 14.

Figure 2:
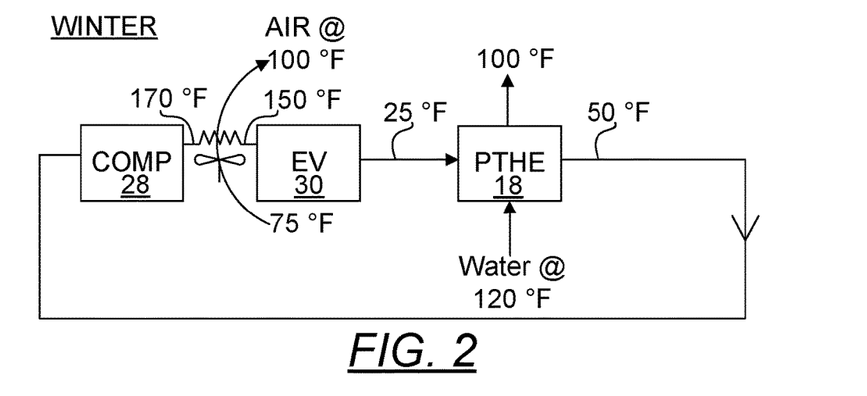
FIG. 2 is a block diagram depicting an example of the states of various components of the present combined hot water, space heating and conditioning system during winter.

FIG. 2 is a block diagram depicting an example of the states of various components of the present combined hot water, space heating and conditioning system during winter and when space heating is taking place. Referring to both FIG. 2 and the refrigerant flow of the heat pump 20 of FIG. 1, it is conceivable that the temperature of refrigerant upstream of the compressor 28 can be about 170 degrees F. Upon heat transfer to the space, with the aid of blower 8, through heat transfer coil 22, the refrigerant temperature drops to about 150 degrees F. before arriving at the expansion valve 30 at which point the refrigerant temperature will drop further to about 25 degrees F. At the secondary heat exchanger 18, heat is transferred from the water flow loop to the refrigerant flow, causing refrigerant temperature to rise to about 50 degrees F. while the water temperature in the water flow loop drops from about 120 degrees F. to about 100 degrees F.

Figure 3:
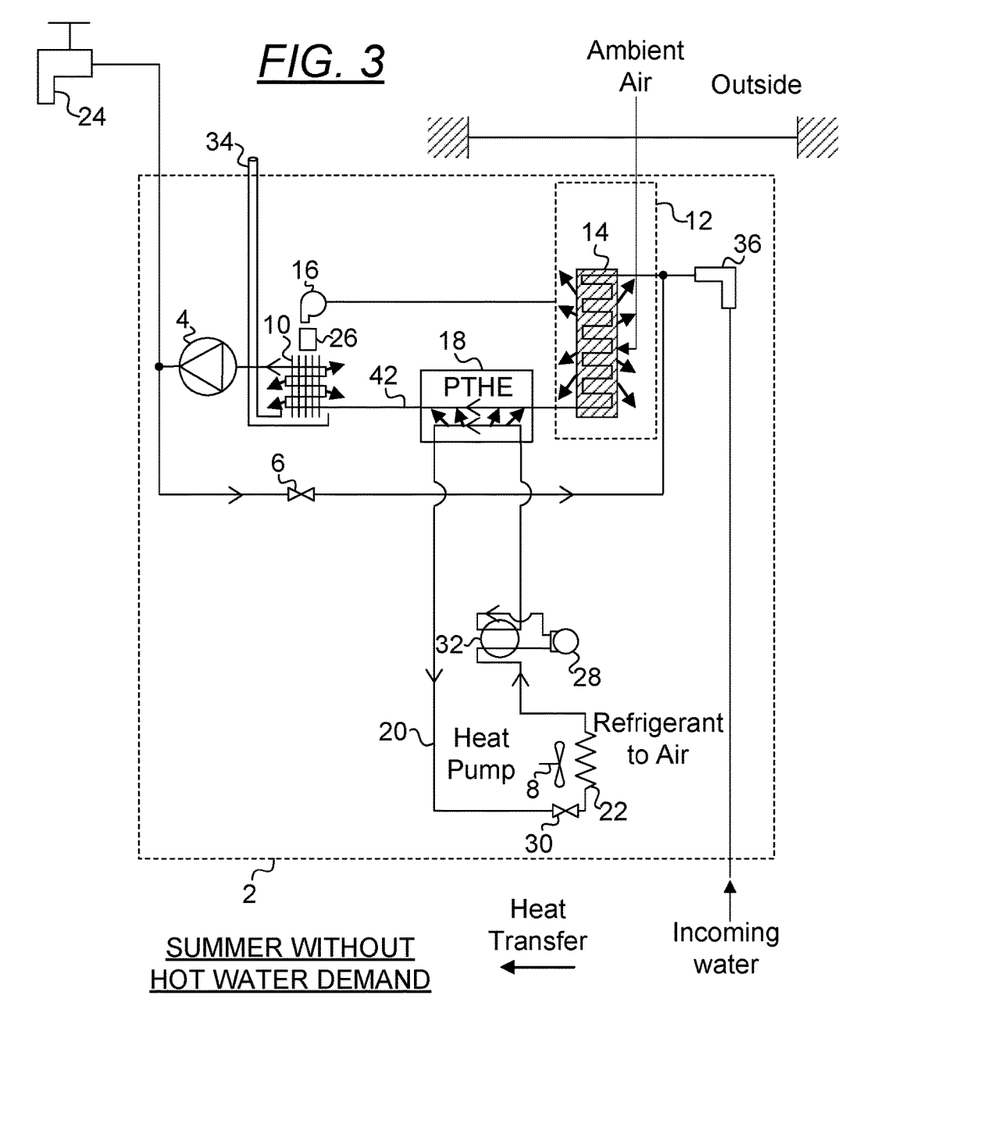
FIG. 3 is a diagram depicting one embodiment of the present combined hot water, space heating and conditioning system during summer without a hot water demand.
Figure 4:
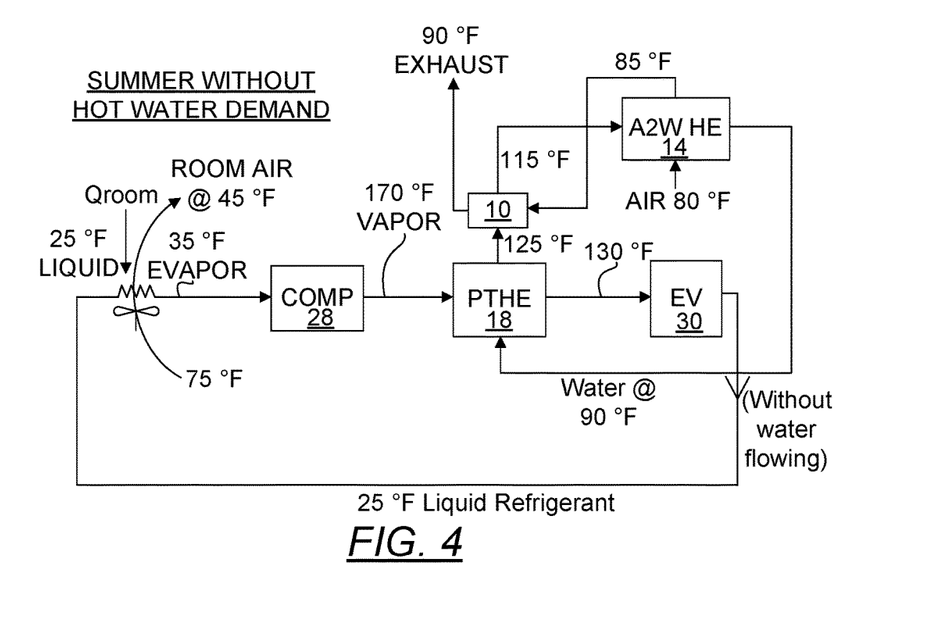
FIG. 4 is a block diagram depicting an example of the states of various components of the present combined hot water, space heating and conditioning system during summer without a hot water demand.
Figure 8:
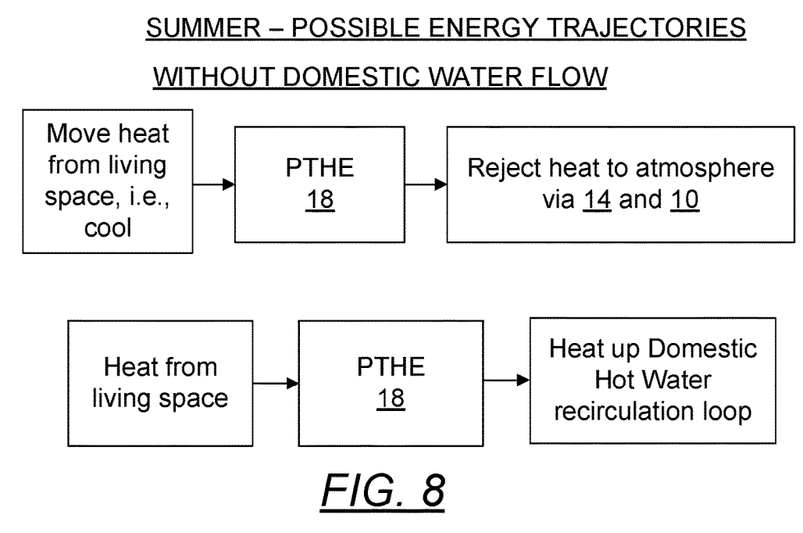
FIG. 8 is a block diagram depicting the actions and conditions of various components of the present combined hot water, space heating and conditioning system during summer without a hot water demand.

FIGS. 3, 4 and 8 depict one or more possible modes of the operation during summer without a hot water demand. FIG. 3 is a diagram depicting one embodiment of the present combined hot water, space heating and conditioning system during summer without a hot water demand. FIG. 4 is a block diagram depicting an example of the states of various components of the present combined hot water, space heating and conditioning system during summer without a hot water demand. FIG. 8 is a block diagram depicting a summary of the actions and conditions of various components of the present combined hot water, space heating and conditioning system during summer without a hot water demand. It shall be noted that the heat pump 20 is turned on in reverse, causing its refrigerant to flow in a direction opposite that shown in FIG. 1. Without a hot water demand and with the valve 6 disposed in an open position, an activation of the fluid mover 4 causes the water flow to circulate through valve 6 in the direction shown. At heat transfer coil 22 and upon expansion of the refrigerant flow, heat is absorbed from the space being cooled. Upon compression at compressor 28 and arrival at the secondary heat exchanger 18, the refrigerant of heat pump 20 loses heat to the water flow which is subsequently rejected from the main heat exchanger 10 and the air-to-water heat exchanger 14 into the ambient air. At a location upstream of the heat transfer coil 22 of the heat pump 20, the refrigerant flow is disposed at about 25 degrees F. This refrigerant flow subsequently absorbs heat from the space to be cooled such that the refrigerant flow is now disposed at about 35 degrees F. The refrigerant is then compressed to about 170 degrees F. by compressor 28. At the secondary heat exchanger 18, heat is rejected into the water flow, increasing the water temperature from about 90 degrees F. to about 125 degrees F. The water flow cools as it goes through the main heat exchanger 10 to about 115 degrees F. and further cools to about 90 degrees F. as it goes through the air-to-water heat exchanger 14. The ambient air at about 80 degrees F. is drawn through the air-to-water heat exchanger 14 and as a result, removing heat from the water flow. Upon going through the air-to-water heat exchanger 14, the ambient air is now heated to about 85 degrees F. This heated air is further drawn through the main heat exchanger 10 to further extract heat from the flow through the main heat exchanger 10 where the temperature of the heated air is further increased to about 90 degrees F.

Figure 5:
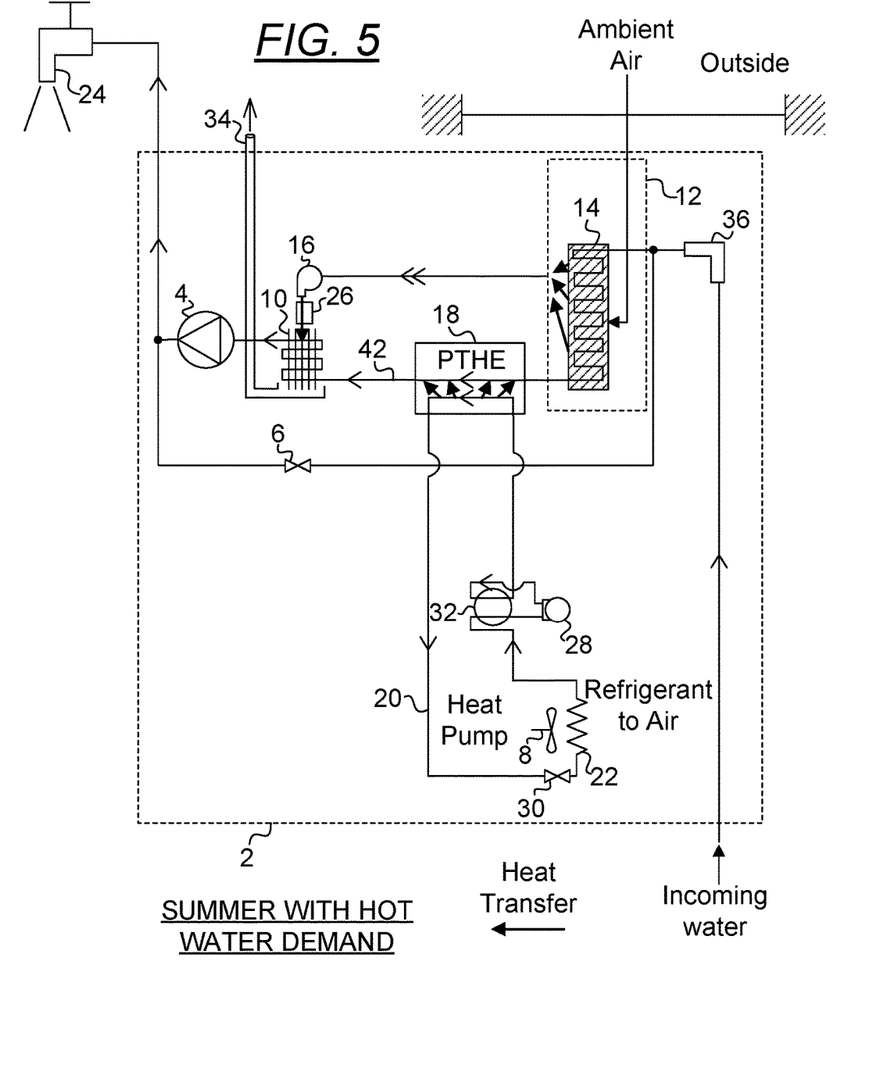
FIG. 5 is a diagram depicting one embodiment of the present combined hot water, space heating and conditioning system during summer with a hot water demand.
Figure 9:
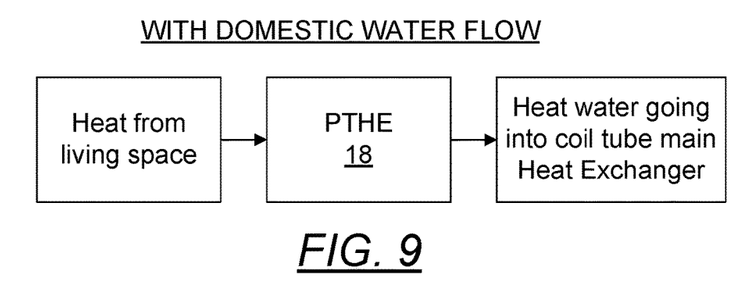
FIG. 9 is a block diagram depicting the actions and conditions of various components of the present combined hot water, space heating and conditioning system during summer with a hot water demand.

With a hot water demand as shown in FIGS. 5 and 9, valve 6 is closed to cause all hot water to be supplied to the point of demand 24. FIG. 5 is a diagram depicting one embodiment of the present combined hot water, space heating and conditioning system during summer with a hot water demand. FIG. 9 is a block diagram depicting a summary of the actions and conditions of various components of the present combined hot water, space heating and conditioning system during summer with a hot water demand. At heat transfer coil 22 and upon expansion of the refrigerant flow, heat is absorbed from the space being cooled. Upon compression at compressor 28 and arrival at the secondary heat exchanger 18, the refrigerant of heat pump 20 loses heat to the water flow which is subsequently heated at the main heat exchanger 10 from the burner 26. Heat transfer can also occur at the air-to-water heat exchanger 14 where heat from the ambient air is absorbed by the water flow. Although the heat gain of water flow through the secondary heat exchanger 18 may not be sufficient to provide hot water at the desired temperature, such supplemental heat reduces the required heat input to the water flow from the burner 26.

Figure 7:
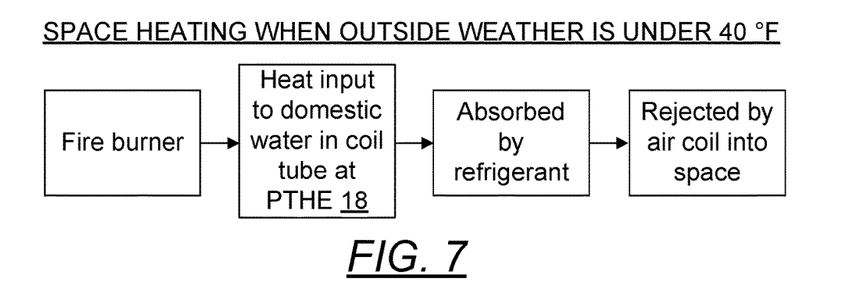
FIG. 7 is a block diagram depicting the actions and conditions of various components of the present combined hot water, space heating and conditioning system when the outside weather is under about 40 degrees F.

FIG. 6 is a block diagram depicting the actions and conditions of various components of the present combined hot water, space heating and conditioning system when the outside weather is between about 40 degrees F. and about 60 degrees F. Heat from the ambient air may be absorbed by a water flow in the main flow loop 42 via heat exchanger 10 and air-to-water heat exchanger 14 and subsequently absorbed by the refrigerant via the secondary heat exchanger 18. Eventually, circulation of refrigerant within the heat pump 20 as it is turned on in reverse, causes this absorbed heat to be dissipated via heat transfer coil 22 into a space to be heated. It is possible that, as the outside weather is rather mild, e.g., when the outdoor temperature is of from about 40 degrees F. to about 60 degrees F., the burner 26 can be kept off for energy savings. When the outdoor temperature drops further, e.g., below about 40 degrees F., the burner 26 may be turned on as shown in FIG. 7. FIG. 7 is a block diagram depicting the actions and conditions of various components of the present combined hot water, space heating and conditioning system when the outside weather is under about 40 degrees F. In this scenario, heat absorbed by the flow in the main flow loop 42 is circulated through the secondary heat exchanger 18 when it is absorbed by the refrigerant which is then circulated in reverse within the heat pump 20, causing this absorbed heat to be dissipated via heat transfer coil 22 into a space to be heated.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A combined liquid heating, space heating and space cooling system configured to provide hot liquid to a point of demand and heat or cool a space, said system including:
   (a) a heat pump operably connected to the space;
   (b) a liquid flow loop comprising:
      (i) a main heat exchanger;
      (ii) a fluid mover for moving a liquid within said liquid flow loop;
      (iii) an air-to-liquid heat exchanger configured for enabling heat transfer between the liquid within said liquid flow loop and ambient air;
   (c) a burner adapted to heat the liquid;
   (d) a blower having an air inlet end and an air outlet end, wherein said blower is adapted to move air through both said air-to-liquid heat exchanger and said main heat exchanger; and
   (e) a secondary heat exchanger operably connecting said flow loop and said heat pump;
   wherein said air-to-liquid heat exchanger is disposed on said air inlet end and said main heat exchanger is disposed on said air outlet end, whereby if heating of the liquid is desired, one of the following sets of conditions or any combinations thereof is selected:
      said burner is turned on and said blower is turned on;
      said fluid mover is turned on;
      said fluid mover is turned on and said heat pump is turned on; and
      said blower is turned on;

if heating of the space is desired, one of the following sets of conditions or any combinations thereof is selected:
  said fluid mover is turned on, said heat pump is turned on in reverse and said blower is turned on; and
  said fluid mover is turned on, said heat pump is turned on in reverse, said burner is turned on and said blower is turned on;
if cooling of the space is desired, at least one of the following sets of conditions or any combinations thereof is selected:
  said fluid mover is turned on and said heat pump is turned on; and
  said fluid mover is turned on, said blower is turned on and said heat pump is turned on.

2. The combined liquid heating, space heating and space cooling system of claim 1, said secondary heat exchanger is a plate type heat exchanger.

3. The combined liquid heating, space heating and space cooling system of claim 1, wherein the liquid is water.

4. A method for controlling a combined liquid heating, space heating and space cooling system configured to provide hot liquid to a point of demand and heat or cool a space, wherein said system comprising:
  (a) a heat pump operably connected to the space;
  (b) a liquid flow loop comprising:
    (i) a main heat exchanger;
    (ii) a fluid mover for moving a liquid within said liquid flow loop; and
    (iii) an air-to-liquid heat exchanger configured for enabling heat transfer between the liquid within said liquid flow loop and ambient air;
  (c) burner thermally coupled to said main heat exchanger, said burner is adapted to heat the fluid;
  (d) a blower having an air inlet end and an air outlet end, wherein said blower is adapted to move air through both said air-to-liquid heat exchanger and said main heat exchanger and said main heat exchanger is disposed on said air outlet end and said air-to-liquid heat exchanger is disposed on said air inlet end; and
  (e) a secondary heat exchanger operably connecting said flow loop and said heat pump,
said method comprising:
  a step selected from the group consisting of:
    turning on said burner and turning on said blower;
    turning on said fluid mover;
    turning on said fluid mover and turning on said heat pump;
    turning on said blower; and any combinations thereof, if heating of the liquid is desired,
  a step selected from the group consisting of:
    turning on said fluid mover, turning on said heat pump in reverse and turning on said blower; and
    turning on said fluid mover, turning on said heat pump in reverse, turning on said burner and turning on said blower; and any combinations thereof, if heating of the space is desired,
  a step selected from the group consisting of:
    turning on said fluid mover and turning on said heat pump; and
    turning on said fluid mover, turning on said blower and turning on said heat pump; and any combinations thereof, if cooling of the space is desired.

5. The method of claim 4, wherein said secondary heat exchanger is a plate-type heat exchanger.

6. The method of claim 4, wherein the liquid is water.

* * * * *